United States Patent
Battaglia

(10) Patent No.: US 9,992,828 B2
(45) Date of Patent: Jun. 5, 2018

(54) METHODS AND SYSTEMS FOR ACCELERATED START-UP FOR A SWITCHING REGULATOR

(71) Applicant: Phoseon Technology, Inc., Hillsboro, OR (US)

(72) Inventor: Salvatore T. Battaglia, Vancouver, WA (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days. days.

(21) Appl. No.: 15/154,744

(22) Filed: May 13, 2016

(65) Prior Publication Data

US 2017/0332449 A1   Nov. 16, 2017

(51) Int. Cl.
*H05B 33/08* (2006.01)

(52) U.S. Cl.
CPC ..... *H05B 33/0815* (2013.01); *H05B 33/0845* (2013.01)

(58) Field of Classification Search
CPC ........ H05B 33/00; H05B 33/02; H05B 33/08; H05B 33/0803; H05B 33/0806; H05B 33/0809; H05B 33/0821; H05B 33/0824; H05B 33/0839; H05B 33/0842; H05B 37/00; H05B 37/02
USPC ........ 315/224, 307, 308, 291, 209 R, 185 R, 315/193
See application file for complete search history.

(56) References Cited

U.S. PATENT DOCUMENTS

| | | | | |
|---|---|---|---|---|
| 7,671,575 | B1 * | 3/2010 | Suzuki | H02M 3/156 323/284 |
| 8,395,325 | B2 * | 3/2013 | Ye | H05B 33/0818 315/122 |
| 8,928,256 | B2 * | 1/2015 | Smith | H05B 33/0842 315/112 |
| 2006/0170466 | A1 | 8/2006 | Park | |
| 2009/0143032 | A1 | 6/2009 | Ojanen et al. | |
| 2009/0189546 | A1 | 7/2009 | Chang Chien et al. | |
| 2010/0026208 | A1 * | 2/2010 | Shteynberg | H05B 33/0815 315/297 |
| 2010/0164462 | A1 | 7/2010 | Yen et al. | |
| 2013/0257313 | A1 * | 10/2013 | Battaglia | H05B 37/02 315/297 |
| 2013/0334980 | A1 * | 12/2013 | Zhou | H05B 33/0845 315/250 |
| 2014/0191740 | A1 | 7/2014 | Ferrario et al. | |

OTHER PUBLICATIONS

ISA Korean Intellectual Property Office, International Search Report and Written Opinion Issued in Application No. PCT/US2017/031812, dated Aug. 8, 2017, WIPO, 14 pages.

* cited by examiner

*Primary Examiner* — Douglas W Owens
*Assistant Examiner* — Wei Chan
(74) *Attorney, Agent, or Firm* — McCoy Russell LLP

(57) ABSTRACT

A system and method for operating one or more light emitting devices is disclosed. In one example, a reference voltage input at an error amplifier receiving a feedback signal from the one or more light emitting devices is adjusted to a first higher voltage independent of a requested irradiance of the one or more light emitting devices during startup in order to accelerate startup of a switching regulator driving the one or more light emitting devices. Subsequently, upon an output of the switching regulator reaching a desired voltage, the reference voltage is adjusted based on the desired irradiance of the one or more light emitting devices.

19 Claims, 7 Drawing Sheets

METHODS AND SYSTEMS FOR ACCELERATED START-UP FOR A SWITCHING REGULATOR

FIELD

The present description relates to systems and methods for improving startup time for a switching regulator controlling the irradiance and/or illuminance response of light-emitting diodes (LEDs).

BACKGROUND/SUMMARY

Solid-state lighting devices have many uses in residential and commercial applications. Some types of solid-state lighting devices may include laser diodes and light-emitting diodes (LEDs). Ultraviolet (UV) solid-state lighting devices may be used to curing photosensitive media such as coatings, including inks, adhesives, preservatives, etc. Solid-state lighting devices may be driven by a switching regulator.

For example, the switching regulator delivers a desired current based on a requested irradiance or illuminance output of the solid-state lighting devices. Some solid-state lighting systems include a feedback circuit that outputs an error voltage based on a comparison of a feedback voltage received from the solid-state devices with a reference voltage. The error voltage is then used to adjust the output of the switching regulator. Typically, the reference voltage is set based on the requested output of the solid-state devices. For example, when the requested output is lower, the reference voltage is lower and as the requested output increases, the reference voltage is increased.

However, the inventors have recognized potential issues with such approaches. As one example, a startup time for the switching regulator to achieve the desired current is dependent on the requested output of the solid-state lighting devices. For example, if the requested output is higher (e.g., 100%), the startup time for the switching regulator is less (e.g., 2 milliseconds); however, if the requested output is lower (e.g., 10%), the startup time for the switching regulator increases (e.g., 20 milliseconds). The delay in the startup time at lower requested outputs is due to a delay in a charging time of the capacitors in the feedback circuit. For example, during startup, if the requested output is lower, the reference voltage is set lower, which causes the capacitors in the feedback circuit to be charged by an associated operation amplifier at a lower current. Consequently, it takes a longer time to generate the error voltage that is required for energizing the switching regulator to obtain the desired regulator output. Hence, the delay in the startup time of the switching regulator increases as the requested output of the solid-state devices decreases.

In one example, the issues described above may be addressed by a lighting system for operating one or more light emitting devices, comprising: one or more light emitting devices; a switching regulator including a regulator output in electrical communication with the one or more light emitting devices; an error amplifier including a first input, an second input, and an error output, the error output in electrical communication with the switching regulator via a pulse-width modulation generator; and a controller including non-transitory instructions to adjust the first input of the error amplifier to a first higher voltage in response to a startup of the lighting system. In this way, the delay in startup time for the switching regulator may be reduced.

As an example, when the lighting system is switched to an ON state from an OFF state (that is during startup of the lighting system), the reference voltage input into an error amplifier of the lighting system is set to a first higher voltage independent of the requested output of the lighting system. The first higher voltage may be based on a maximum irradiance or illuminance capability of the lighting system (e.g., 100% irradiance). By setting the reference voltage of the error amplifier at the first higher voltage, the error amplifier is forced to charge the capacitors in the feedback circuit with a higher current. Consequently, the output of the error amplifier increases at a faster rate and hence, the delay in generating the desired error voltage for energizing the switching regulator during startup is reduced. Upon obtaining a desired output of the switching regulator (the desired output based on the requested output of the lighting system), the reference voltage of the error amplifier is adjusted based on the requested output of the lighting system. For example, if the requested output of the lighting system is 10%, at startup, the reference voltage is set to a first higher voltage, the first higher voltage based on 100% requested output. Simultaneously, the output of the switching regulator is monitored, and when the output of the switching regulator reaches a desired output, where the desired output is based on the requested output (that is, 10%), the reference voltage is decreased from the first higher voltage (based on 100% output) to a second voltage (based on the 10% requested output).

In this way, accelerated startup of the switching regulator driving the lighting system may be achieved independent of the requested output of the lighting system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
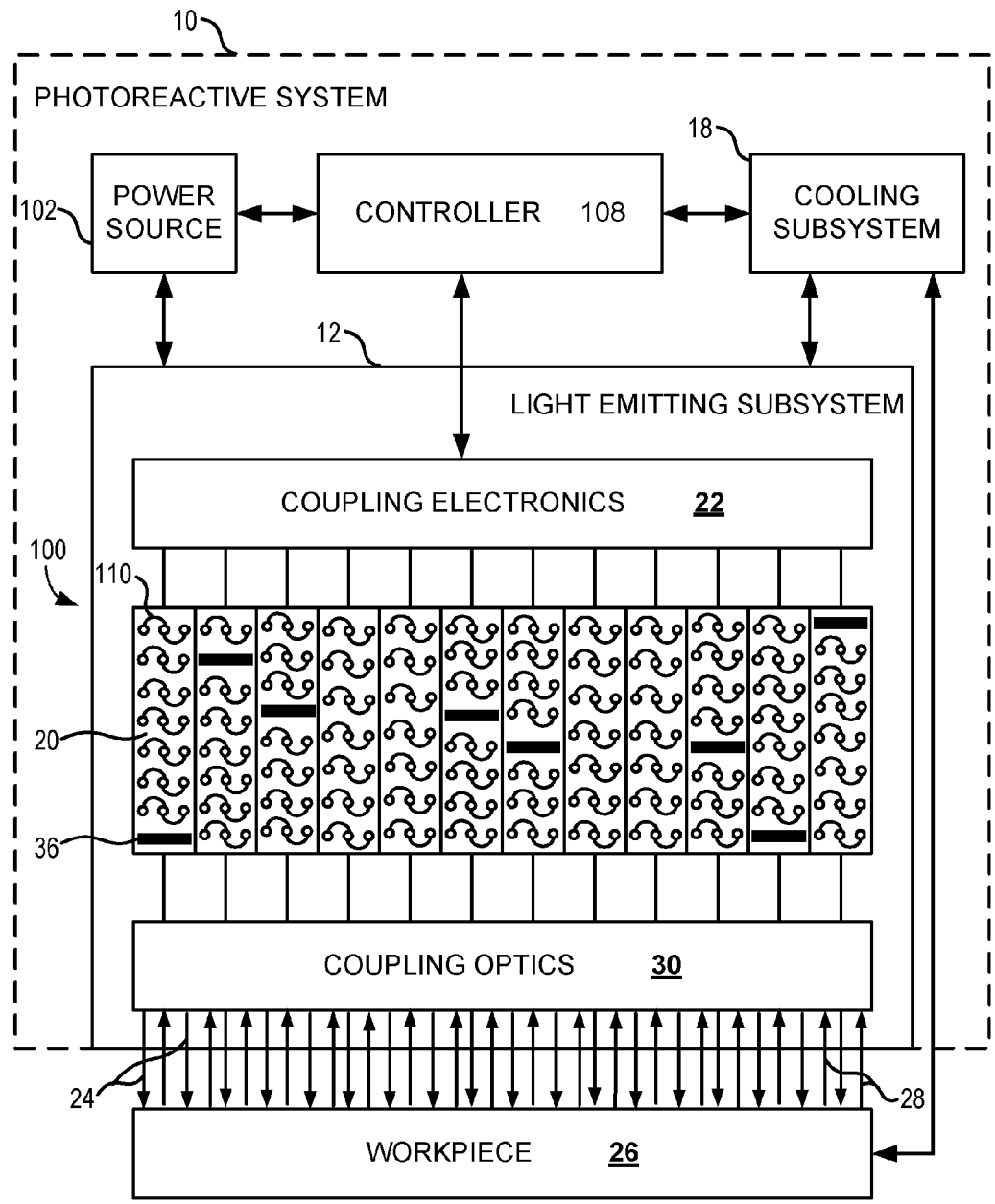
FIG. 1 shows a schematic depiction of a lighting system.

The present description is related to a lighting system for improving startup time of a switching regulator driving the lighting system. FIG. 1 shows one example lighting system that includes a switching regulator for controlling output of the lighting system. The first output control of the lighting system may be provided according to an example circuit shown in FIG. 2. A second output control of the lighting system may be provided via a switching regulator and an error amplifier according to an example circuit shown in FIG. 3. The error amplifier may provide feedback from the lighting system to the switching regulator for controlling output of the lighting system. An example error amplifier circuit providing feedback to the switching regulator shown in FIG. 4. An example output response of the error amplifier of FIG. 4 during startup conditions of the lighting system is illustrated at FIG. 5. The lighting system may be operated according to the method of FIG. 6 to provide accelerated startup of the switching regulator driving the lighting system. An example operating sequence of the lighting system for accelerated startup of the switching regulator according to the present disclosure is shown at FIG. 7. Electrical interconnections shown between components in the various electrical diagrams represent current paths between the illustrate devices.

Referring now to FIG. 1, a block diagram of a photoreactive system 10 in accordance with the system and method described herein is shown. In this example, the photoreactive system 10 comprises a lighting subsystem 100, a controller 108, a power source 102 and a cooling subsystem 18.

The lighting subsystem 100 may comprise a plurality of light emitting devices 110. Light emitting devices 110 may be LED devices, for example. Selected of the plurality of light emitting devices 110 are implemented to provide radiant output 24. The radiant output 24 is directed to a work piece 26. Returned radiation 28 may be directed back to the lighting subsystem 100 from the work piece 26 (e.g., via reflection of the radiant output 24).

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis.

Each of the layers, materials or other structure may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor devices to the work piece 26, reflection at that interface may be reduced, eliminated, or minimized, so as to enhance the transmission of radiant output at that interface for ultimate delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the work piece 26.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component 12, 102, 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the work piece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific work piece, photoreaction, and/or set of operating conditions) controller 108 may operate photoreactive system 10 to implement a first control strategy, whereas under a second set of conditions (e.g. for a specific work piece, photoreaction, and/or set of operating conditions) controller 108 may operate photoreactive system 10 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, and the different group of LED devices may include a subset of one or more LED devices from the second group.

The cooling subsystem 18 is implemented to manage the thermal behavior of the lighting subsystem 100. For example, generally, the cooling subsystem 18 provides for cooling of such subsystem 12 and, more specifically, the semiconductor devices 110. The cooling subsystem 18 may also be implemented to cool the work piece 26 and/or the space between the piece 26 and the photoreactive system 10 (e.g., particularly, the lighting subsystem 100). For example, cooling subsystem 18 may be an air or other fluid (e.g., water) cooling system.

The photoreactive system 10 may be used for various applications. Examples include, without limitation, curing applications ranging from ink printing to the fabrication of DVDs and lithography. Generally, the applications in which the photoreactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may need to be delivered at or near the work piece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photoreactive system 10 may also have associated operating specifications. These specifications may include ranges (e.g., maximum and minimum) for operating temperatures and applied, electrical power, among other parameter specifications.

Accordingly, the photoreactive system 10 supports monitoring of the application's parameters. In addition, the photoreactive system 10 may provide for monitoring of semiconductor devices 110, including their respective characteristics and specifications. Moreover, the photoreactive system 10 may also provide for monitoring of selected other components of the photoreactive system 10, including their respective characteristics and specifications.

Providing such monitoring may enable verification of the system's proper operation so that operation of photoreactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting subsystem 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the work piece 26 sufficient to properly complete the photoreaction(s) of the application.

In some applications, high radiant power may be delivered to the work piece 26. Accordingly, the subsystem 12 may be implemented using an array of light emitting semiconductor devices 110. For example, the subsystem 12 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

Furthermore, based on coupling electronics, selected of the semiconductor devices in the array 20 may be either/both multifunction devices and/or multimode devices, where (a)

multifunction devices are capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices are capable of emission, detection and some other mode (e.g., off) and are switched among modes in accordance with the application parameters or other determinative factors.

Figure 2:
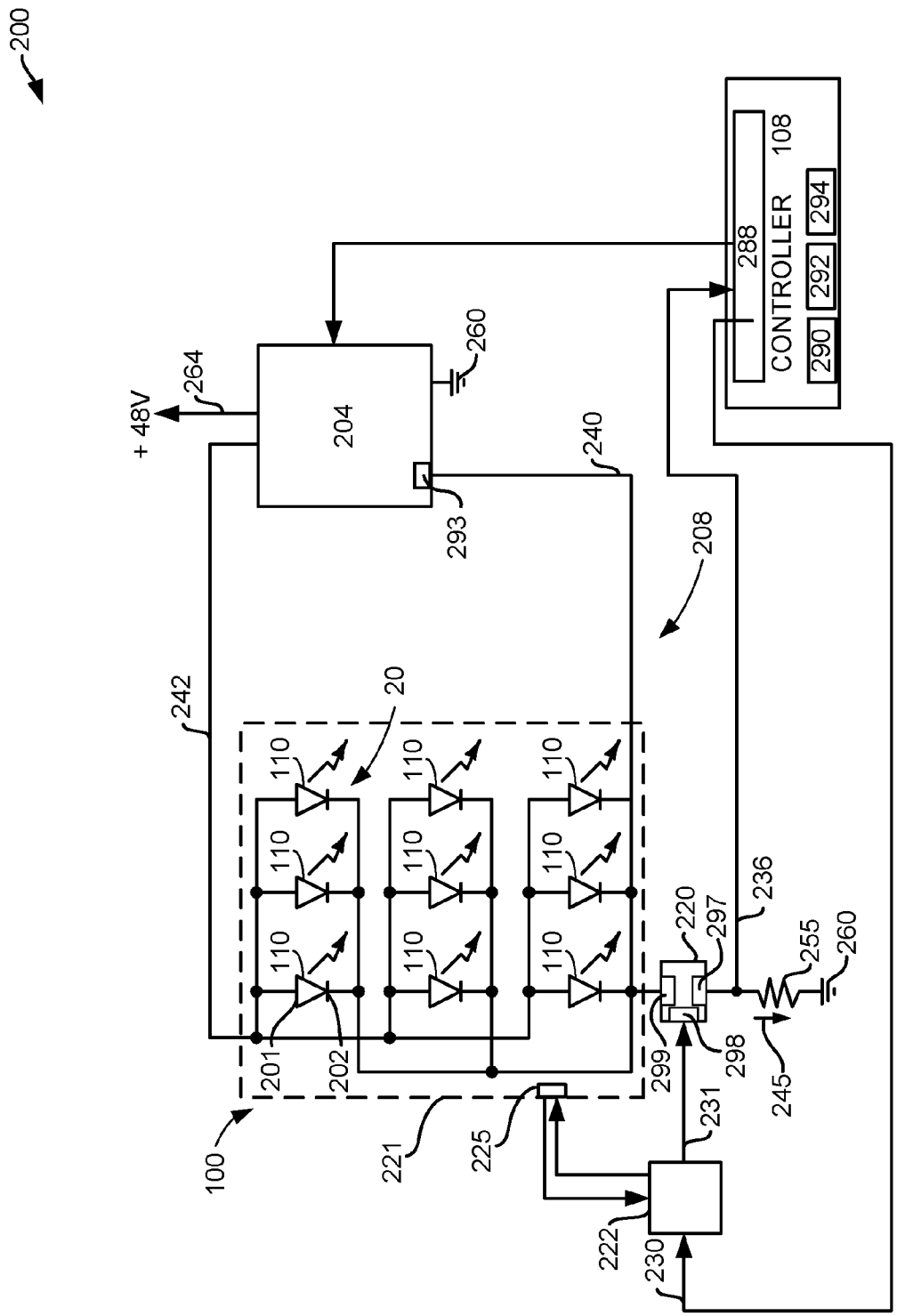
FIGS. 2-3 show schematics of example regulating systems for the lighting system in FIG. 1.

Referring to FIG. 2, a schematic of a first lighting system circuit 200 that may supply varying amounts of current to lighting system 100 is shown. Lighting system 100 includes one or more light emitting devices 110. In this example, light emitting devices 110 are light emitting diodes (LEDs). Each LED 110 includes an anode 201 and a cathode 202. Switching power source 102 shown in FIG. 1 supplies 48V DC power to voltage regulator 204 via path or conductor 264. Voltage regulator 204 supplies DC power to the anodes 201 of LEDs 110 via conductor or path 242. Voltage regulator 204 is also electrically coupled to cathodes 202 of LEDs 110 via conductor or path 240. Voltage regulator 204 is shown referenced to ground 260 and may be a buck regulator in one example. Controller 108 is shown in electrical communication with voltage regulator 204. In other examples, discrete input generating devices (e.g., switches) may replace controller 108, if desired. Controller 108 includes central processing unit 290 for executing instructions. Controller 108 also includes inputs and outputs (I/O) 288 for operating voltage regulator 204 and other devices. Non-transitory executable instructions may be stored in read only memory 292 (e.g., non-transitory memory) while variables may be stored in random access memory 294. Voltage regulator 204 supplies an adjustable voltage to LEDs 110.

Variable resistor 220 in the form of a field-effect transistor (FET) receives an intensity signal voltage from controller 108 or via another input device. While the present example describes the variable resistor as an FET, one must note that the circuit may employ other forms of variable resistors.

In this example, at least one element of array 20 includes solid-state light-emitting elements such as light-emitting diodes (LEDs) or laser diodes produce light. The elements may be configured as a single array on a substrate, multiple arrays on a substrate, several arrays either single or multiple on several substrates connected together, etc. In one example, the array of light-emitting elements may consist of a Silicon Light Matrix™ (SLM) manufactured by Phoseon Technology, Inc.

The circuit shown in FIG. 2 is a closed loop current control circuit 208. In closed loop circuit 208, the variable resistor 220 receives an intensity voltage control signal via conductor or path 230 through the drive circuit 222. The variable resistor 220 receives its drive signal from the driver 222. Voltage between variable resistor 220 and array 20 is controlled to a desired voltage as determined by voltage regulator 204. The desired voltage value may be supplied by controller 108 or another device, and voltage regulator 204 controls voltage signal 242 to a level that provides the desired voltage in a current path between array 20 and variable resistor 220. Variable resistor 220 controls current flow from array 20 to current sense resistor 255 in the direction of arrow 245. The desired voltage may also be adjusted responsive to the type of lighting device, type of work piece, curing parameters, and various other operating conditions. An electrical current signal may be fed back along conductor or path 236 to controller 108 or another device that adjusts the intensity voltage control signal pro-vided to drive circuit 222 responsive to current feedback provided by path 236. In particular, if the electrical current signal is different from a desired electrical current, the intensity voltage control signal passed via conductor 230 is increased or decreased to adjust electrical current through array 20. A feedback current signal indicative of electrical current flow through array 20 is directed via conductor 236 as a voltage level that changes as electrical current flowing through current sense resistor 255 changes.

In one example where the voltage between variable resistor 220 and array 20 is adjusted to a constant voltage, current flow through array 20 and variable resistor 220 is adjusted via adjusting the resistance of variable resistor 220. Thus, a voltage signal carried along conductor 240 from the variable resistor 220 does not go to the array 20 in this example. Instead, the voltage feedback between array 20 and variable resistor 220 follows conductor 240 and goes to a voltage regulator 204. The voltage regulator 204 then outputs a voltage signal 242 to the array 20. Consequently, voltage regulator 204 adjusts its output voltage in response to a voltage downstream of array 20, and current flow through array 20 is adjusted via variable resistor 220. Controller 108 may include instructions to adjust a resistance value of variable resistor 220 in response to array current fed back as a voltage via conductor 236. Conductor 240 allows electrical communication between the cathodes 202 of LEDs 110, input 299 (e.g., a drain of an N-channel MOSFET) of variable resistor 220, and voltage feedback input 293 of voltage regulator 204. Thus, the cathodes 202 of LEDs 110, an input side 299 of variable resistor 220, and voltage feedback input 293 are at the same voltage potential.

The variable resistor may take the form of an FET, a bipolar transistor, a digital potentiometer or any electrically controllable, current limiting device. The drive circuit may take different forms depending upon the variable resistor used. The closed loop system operates such that an output voltage regulator 204 remains about 0.5 V above a voltage to operate array 20. The regulator output voltage adjusts voltage applied to array 20 and the variable resistor controls current flow through array 20 to a desired level. The present circuit may increase lighting system efficiency and reduce heat generated by the lighting system as compared to other approaches. In the example of FIG. 2, the variable resistor 220 typically produces a voltage drop in the range of 0.6V. However, the voltage drop at variable resistor 220 may be less or greater than 0.6V depending on the variable resistor's design.

Thus, the circuit shown in FIG. 2 provides voltage feedback to a voltage regulator to control the voltage drop across array 20. For example, since operation of array 20 results in a voltage drop across array 20, voltage output by voltage regulator 204 is the desired voltage between array 20 and variable resistor 220 plus the voltage drop across array 20. If the resistance of variable resistor 220 is increased to decrease current flow through array 20, the voltage regulator output is adjusted (e.g., decreased) to maintain the desired voltage between array 20 and variable resistor 220. On the other hand, if the resistance of variable resistor 220 is decreased to increase current flow through array 20, the voltage regulator output is adjusted (e.g., increased) to maintain the desired voltage between array 20 and variable resistor 20. In this way, the voltage across array 20 and current through array 20 may be simultaneously adjusted to provide a desired light intensity output from array 20. In this example, current flow through array 20 is adjusted via a device (e.g., variable resistor 220) located or positioned downstream of array 20 (e.g., in the direction of current flow) and upstream of a ground reference 260.

In this example, array 20 is shown were all LEDs are supplied power together. However, current through different groups of LEDs may be controlled separately via adding additional variable resistors 220 (e.g., one for each array that is supplied controlled current). Controller 108 adjusts current through each variable resistor to control current through multiple arrays similar to array 20.

Figure 3:
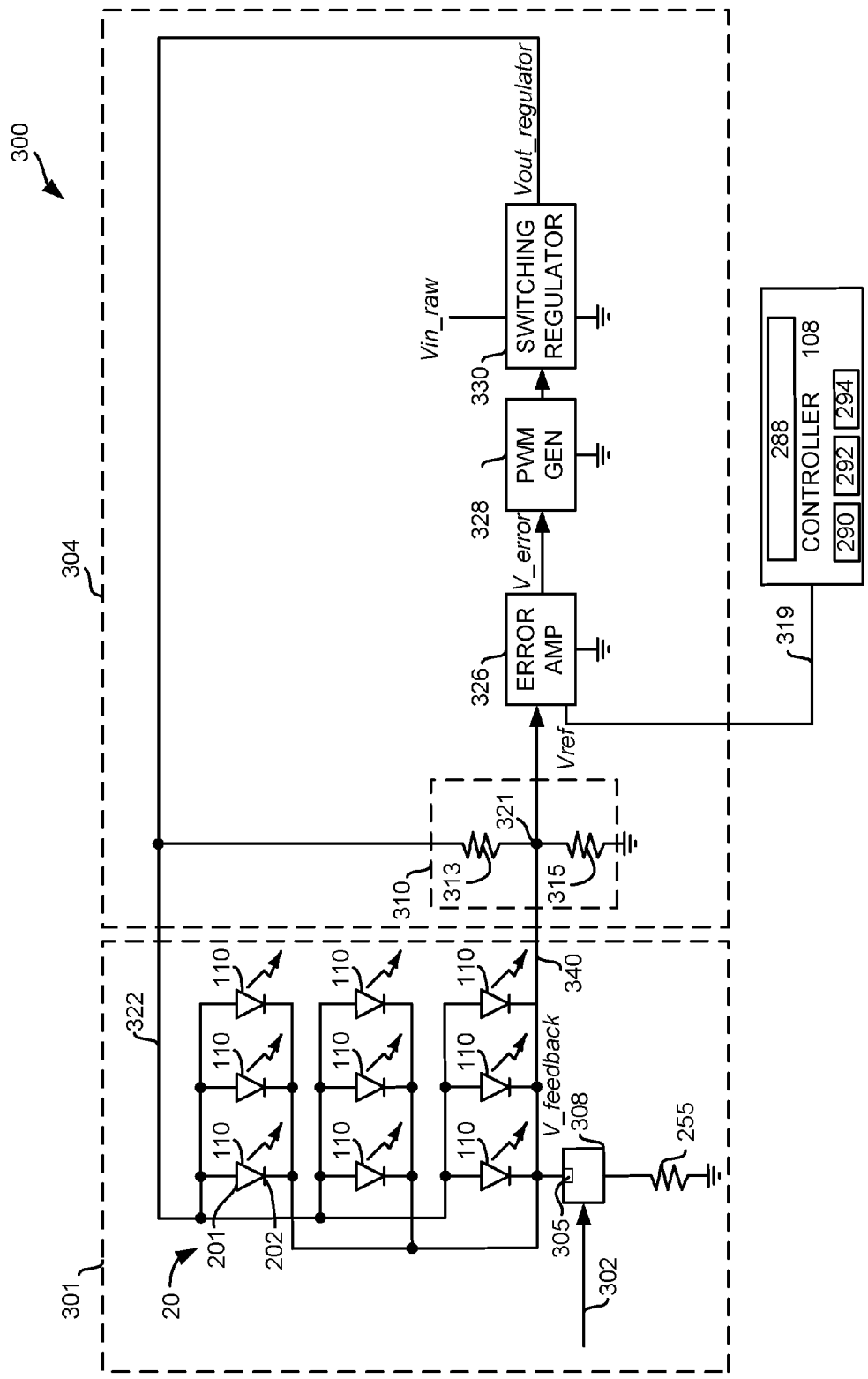

Referring now to FIG. 3, a schematic of a second lighting system circuit 300 that may be supplied varying amounts of current is shown. FIG. 3 includes some of the same elements as the first lighting system circuit shown in FIG. 2. Elements in FIG. 3 that are the same as elements in FIG. 2 are labeled with the same numeric identifiers. For the sake of brevity, a description of same elements between FIG. 2 and FIG. 3 is omitted; however, the description of elements in FIG. 2 applies to the elements in FIG. 3 that have the same numerical identifiers.

The lighting system shown in FIG. 3 includes a SLM section 301 that includes array 20, which includes LEDs 110. The SLM also includes switch 308 and current sense resistor 255. However, switch 308 and current sense resistor may be included with voltage regulator 304 or as part of controller 108 if desired. Voltage regulator 304 includes voltage divider 310, which is comprised of resistor 313 and resistor 315. Conductor 340 puts voltage divider 310 into electrical communication with cathodes 202 of LEDs 110 and switch 308. Thus, the cathodes 202 of LEDs 110, an input side 305 (e.g., a drain of a N channel MOSFET) of switch 308, and node 321 between resistors 313 and 315 are at a same voltage potential, which is referred to as V_feedback herein.

Switch 308 is operated in only open or closed states, and it does not operate as a variable resistor having a resistance that can be linearly or proportionately adjusted. Further, in one example, switch 308 has a Vds of 0 V as compared to 0.6V Vds for variable resistor 220 shown in FIG. 2.

The lighting system circuit of FIG. 3 also includes an error amplifier 326 receiving the voltage V_feedback that is indicative of current passing through array 20 via conductor 340 as measured by current sense resistor 255. Error amplifier 326 also receives a reference voltage Vref from controller 108 or another device via conductor 319. Output from error amplifier 326 is supplied to the input of pulse width modulator (PWM) 328. Output from error amplifier 326 is referred to as V_error herein. V_error is compared to an oscillator ramp signal by the PWM 328. Output from PWM 328 is a rectangular pulse that is supplied to a switching regulator 330, and switching regulator 330 adjusts current supplied between a regulated DC power supply (e.g., 102 of FIG. 1) and array 20 from a position upstream of array 20.

In some examples, it may be desirable to adjust current to array via a device located or upstream (e.g., in the direction of current flow) of array 20 instead of a position that is downstream of array 20 as is shown in FIG. 2. In the example lighting system of FIG. 3, a voltage the feedback signal supplied via conductor 340 goes directly to voltage regulator 304. A current demand, which may be in the form of an intensity voltage control signal, is supplied via conductor 319 from controller 108. The signal becomes a reference signal Vref, and it is applied to error amplifier 326 rather than to the drive circuit for a variable resistor. The current demand, and hence Vref may be based on a requested output of the array, except during starting of switching regulator 330 when the requested output may be replaced or overridden such that a predetermined output (e.g., an output that provides a desired startup time in which the switching regulator provides a desired output in a desired amount of time) independent of the requested output voltage for a desired irradiance of the one or more light emitting devices is supplied as the Vref signal. The requested output may be a requested irradiance or illuminance. In one example, the requested output of the array may be based on a user input. For example, controller 108 may receive the user input via a user interface. The user input may indicate a requested irradiance, illuminance, or intensity of the array. Controller 108 may then determine the current demand based on which Vref may be adjusted during the operation of the array. In other examples, the requested output of the array may be based on type of work piece, curing parameters, and various other operating conditions.

In addition to adjusting Vref based on the requested output of array, one or more operating conditions of array 20 may be taken into account in adjusting Vref. The operating conditions of the array 20 may include but limited to an activation status (e.g., ON or OFF state or startup conditions) of array 20, a voltage output of the switching regulator 330 (Vout_regulator), and voltage output from error amplifier 326 (V_error). For example, under a first operating condition of array 20, controller 108 may implement a first control strategy for adjusting Vref; whereas under a second different operating condition of array 20, controller 108 may implement a second control strategy for adjusting Vref. For example, during startup conditions of array 20, when switch 308 is switched to ON state from an OFF state, controller 108 may adjust Vref in order to accelerate startup of switching regulator 330. After the switching regulator is energized, which may be determined based on the output voltage (Vout_regulator) of the switching regulator 330, controller 108 may adjust Vref based on a different criteria. In one example, during startup conditions, Vref may be adjusted to a first higher voltage independent of requested irradiance or intensity of the array until the switching regulator is energized. After the switching regulator is energized, Vref may be adjusted based on the requested irradiance of the lighting array. Details of adjusting Vref will be further discussed below with respect to FIGS. 4-7.

The voltage regulator 304 directly controls the SLM current from a position upstream of array 20. In particular, resistor divider network 310 causes the buck regulator stage 330 to operate as a traditional buck regulator that monitors the output voltage of switching regulator 330 when the SLM is disabled by opening switch 308. The SLM may selectively receive an enable signal from conductor 302 which closes switch 308 and activates the SLM to provide light. In the present example, switching regulator is configured as a buck regulator. Buck regulator 330 operates differently when a SLM enable signal is applied to conductor 302. Specifically, unlike more typical buck regulators, the buck regulator controls the load current, the current to the SLM and how much current is pushed through the SLM. In particular, when switch 308 is closed, current through array 20 is determined based on voltage that develops at node 321.

The voltage at node 321 is based on the current flowing through current sense resistor 255 and current flow in voltage divider 310. Thus, the voltage at node 321 is representative of current flowing through array 20. A voltage representing SLM current is compared to a reference voltage provided by controller 108 via conductor 319 that represents a desired current flow through the SLM. If the SLM current is different from the desired SLM current, an error voltage develops at the output of error amplifier 326. The error voltage adjusts a duty cycle of PWM generator 328 and a pulse train from PWM generator 328 controls a charging time and a discharging time of a coil within regulator 330. The coil charging and discharging timing adjusts an output voltage of voltage regulator 304. Current flow through array 20 may be adjusted via adjusting the voltage output from voltage regulator 304 and supplied to array 20. If additional array current is desired, voltage output from voltage regulator 304 is increased. If reduced array current is desired, voltage output from voltage regulator 304 is decreased.

Error amplifier 326 may include a compensation network for stabilizing an output of switching regulator 330. The compensation network may include one or more capacitors. The capacitors associated with the error amplifier are charged during startup when the array is switched from an OFF state to an ON state. Therefore, during startup, it takes a duration for the output of the error amplifier to reach a threshold error voltage that may initiate the ON state in the output of the PWM 328. The duration for the output of the error amplifier to reach the threshold error voltage may be based on Vref. For example, when Vref is higher, more current may be forced through the compensation network, which may cause the capacitors in the compensation network to charge faster; whereas when Vref is lower, less current may flow through the compensation network and hence, the capacitors may take a longer duration to charge. The delay in charging of the capacitors may cause a delay in the error output reaching the threshold voltage, which results in a delay in the startup of the switching regulator. Therefore, during startup, when array 20 is switched to an ON (active) state from an OFF (inactive) state, controller 108 may adopt a control strategy to accelerate startup of the buck regulator. In one example, controller 108 may set Vref to a first higher voltage based on a hundred percent irradiance output of array 20 in order to accelerate startup of the switching regulator. Controller 108 may monitor Vout_regulator during the startup. In response to Vout_regulator reaching a desired voltage, the desired voltage based on a requested output of the lighting array, controller 108 may set Vref based on the requested output. Further details of the error amplifier 326 are discussed with respect to FIG. 4 below. The change in output of the error amplifier based on Vref will be illustrated with respect to FIG. 5. Details of the control strategy executed by controller 108 for accelerating start-up of switching regulator 330 will be further described with respect to FIGS. 6 and 7.

Figure 4:
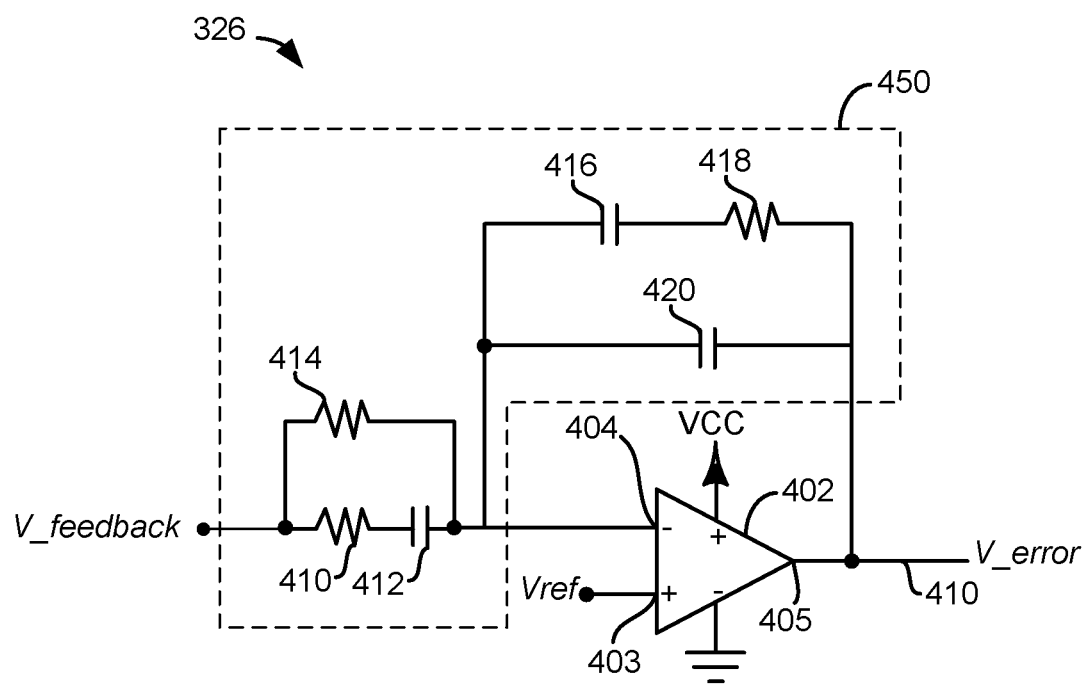
FIG. 4 shows a schematic of an error amplifier and an associated compensation network for the lighting system shown in FIGS. 1 and 3.
Figure 5:
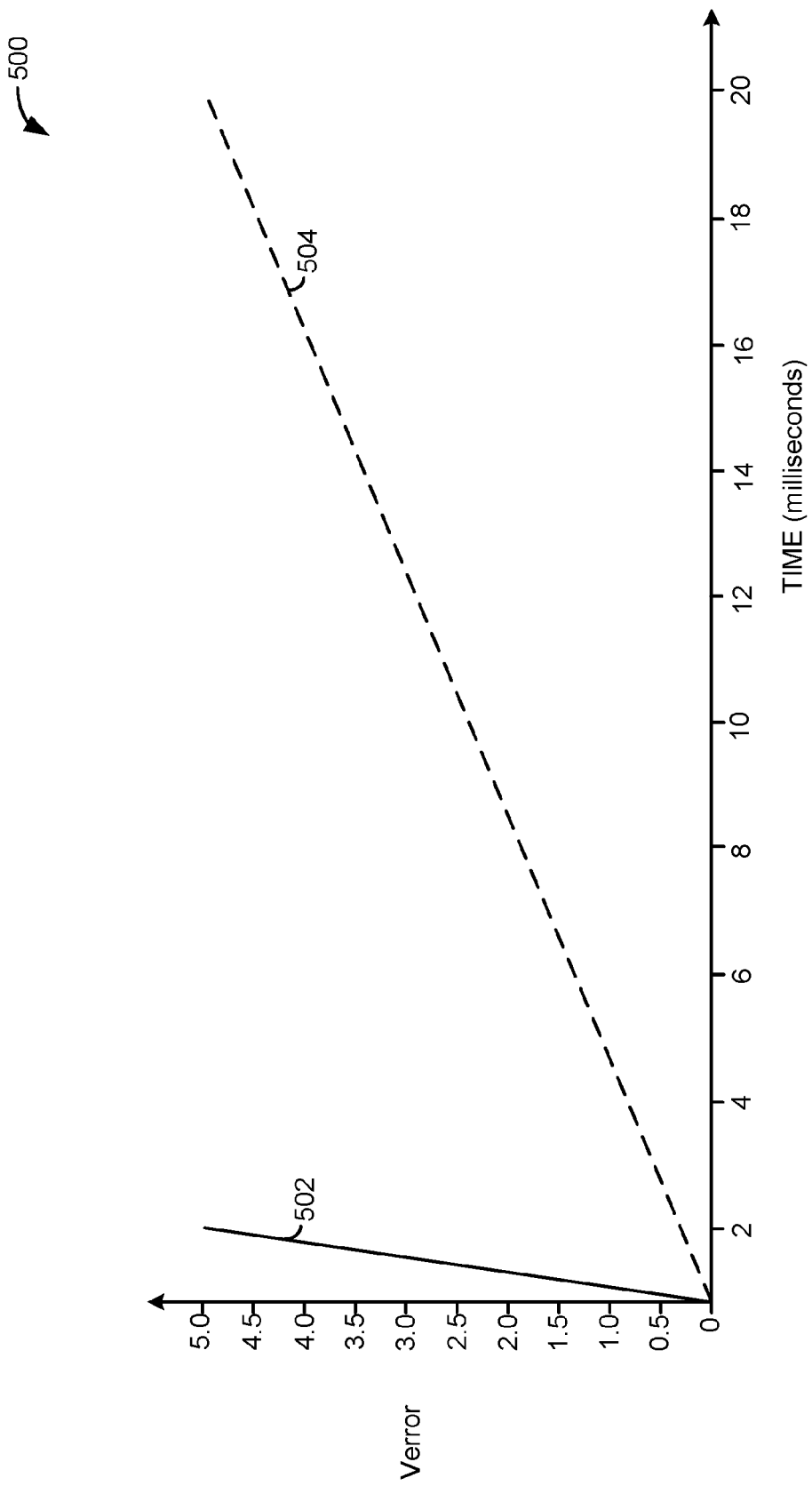
FIG. 5 shows an example graph illustrating change in output of an error amplifier during startup of the lighting system shown in FIGS. 1 and 3.

Referring now to FIG. 4, an example error amplifier 326 for supplying an error voltage (V_error) to a PWM generator 328 that controls a voltage output (Vout_regulator) of a switching regulator 330 is shown. The error amplifier 326 includes an operational amplifier 402 with a compensation network 450 added to the operational amplifier 402 for regulating an output voltage of the switching regulator receiving the error signal from the operational amplifier 402. A control voltage (Vref) for outputting a desired irradiance or light intensity is input to operational amplifier 402 at non-inverting input terminal 403. The voltage at the inverting input terminal 404 is based on the voltage at node 32, that is, V_feedback. The compensation network 450 includes a first branch comprising a resistor 418 and a capacitor 416 in series with the resistor 418, and a capacitor 40 in parallel with the resistor 418 and capacitor 416. The compensation network 450 includes a second branch comprising a resistor 414 in parallel with a resistor 410 and a capacitor 412 arranged in series. The compensation network 450 provides feedback to the operational amplifier 402. During start-up, the capacitors 416, 420, and 412 are charged based on the difference between the non-inverting input 403 and the inverting input 404. Therefore, when the voltage at the non-inverting input is low, such as when the requested output of the array 20 (or requested irradiance) is low, the current through the compensation network is low, which increases a duration of charging of the capacitors in the compensation network. As a result, a duration for the output voltage of the error amplifier to increase is longer and hence, a duration to energize the switching regulator 330 is longer. Consequently, there is a delay in the switching regulator 330 reaching a desired output for driving the lighting array at the requested irradiance. Therefore, in order to reduce the duration for energizing the voltage regulator, during start-up conditions when the SLM is changed from an OFF state to an ON state, the voltage at the non-inverting input may be set to a first higher voltage. The first higher voltage may be a maximum voltage based on a maximum irradiance output of the lighting array (e.g., 100% irradiance output). By setting Vref to the first higher voltage, current through the compensation network may be increased and hence, the capacitors in the compensation network may be charged at a faster rate by the current. This may in turn cause the output of the error amplifier to increase at a faster rate, thereby decreasing a duration of rise time for the voltage output by the error amplifier. Increase in voltage output by the error amplifier at different voltages of the non-inverting input is illustrated at FIG. 5.

FIG. 5 shows a plot of an example change in output of an error amplifier, such as error amplifier 326, based on a voltage at a non-inverting input terminal of the error amplifier during start-up of an SLM, such as array 20 at FIGS. 1-3. The Y axis represents voltage (V_error) at an output terminal of the error amplifier and the voltage increases in the direction of Y axis arrow. The X axis represents time and time increases from the left side of the plot to the right side of the plot.

The plot includes two curves 502 and 504. Curve 502 represents voltage output of the error amplifier over time in response to start-up of the SLM when the non-inverting input voltage is at a maximum voltage. The maximum voltage may be based on a maximum irradiance of the lighting array. Thus, the maximum voltage is based on 100% irradiance or illuminance of the lighting array. Curve 504 represents voltage output of the error amplifier over time in response to start-up of the SLM when the non-inverting input voltage is based on 10% irradiance or illuminance of the lighting array.

It may be observed that curve 502 increases at a faster rate than curve 504. Thus, when the non-inverting input voltage is at a higher voltage, more current is forced through a network, such as compensation network 450 at FIG. 4, which reduces a charging time of the capacitors in the compensation network. Consequently, V_error increases at a faster rate (2 milliseconds to reach 5 volts) when the non-inverting input voltage is at maximum voltage (based on 100% irradiance) than when the non-inverting input voltage is set based on the desired irradiance (based on 10% irradiance in this example). As noted above at FIGS. 3 and 4, the output of the error amplifier (V_error) controls a duty cycle of a PWM generator, such as PWM 328. The duty cycle of the PWM generator controls a voltage output of a switching regulator, such as regulator 330. Accordingly, during start-up of the SLM, if Vref is set based on 100% irradiance, $V_{13}$ error increases at a faster rate. Consequently, an ON time of a pulse width modulated output signal of the PWM generator starts at an earlier time point. Thus, the switching regulator is switched ON earlier than when V_error increases at a slower rate, such as during conditions when Vref is set less than maximum voltage.

Figure 6:
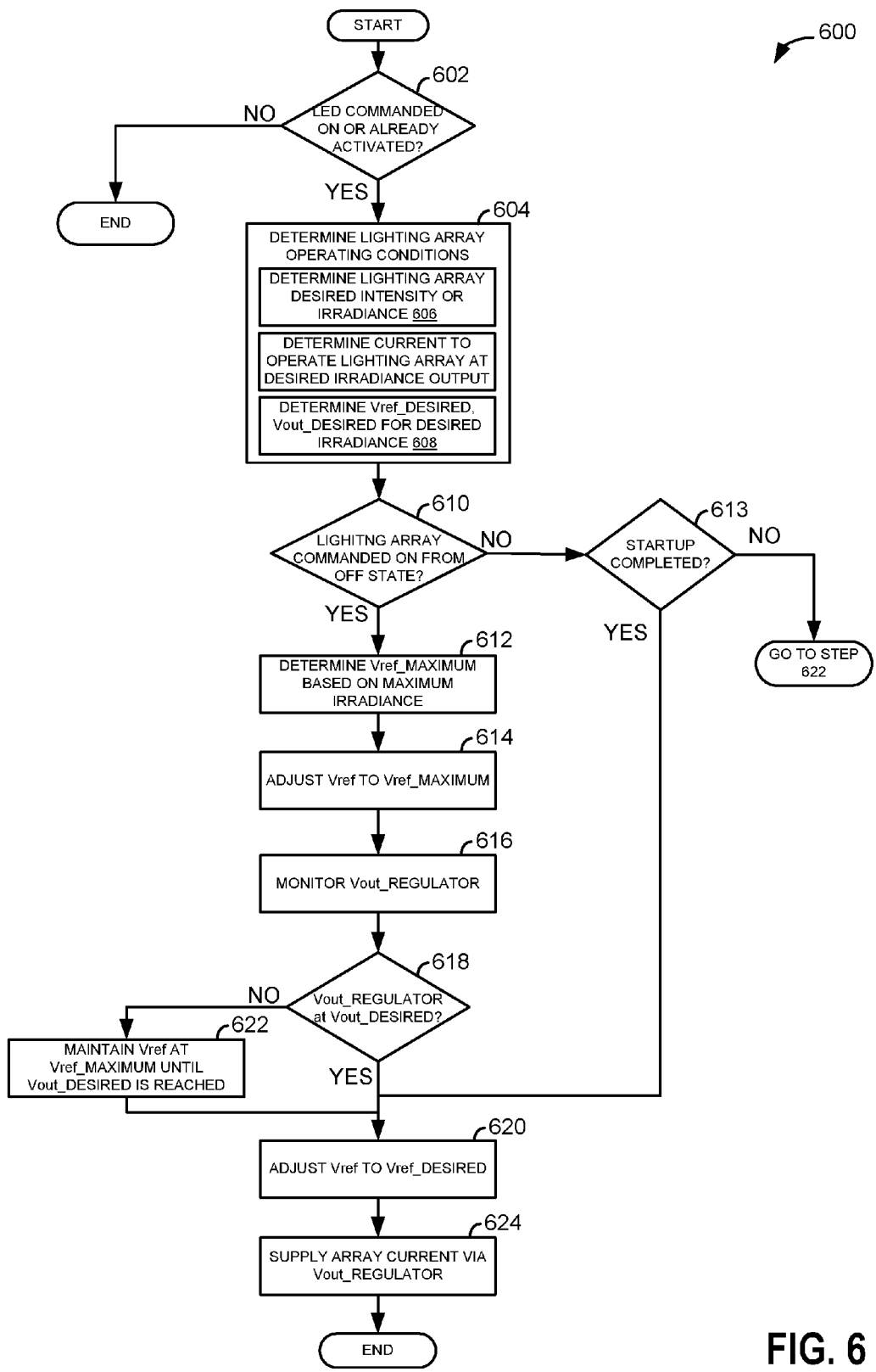
FIG. 6 shows an example method for operating the lighting system shown in FIGS. 1 and 3 to provide accelerated start up time of a switching regulator driving the lighting system.
Figure 7:
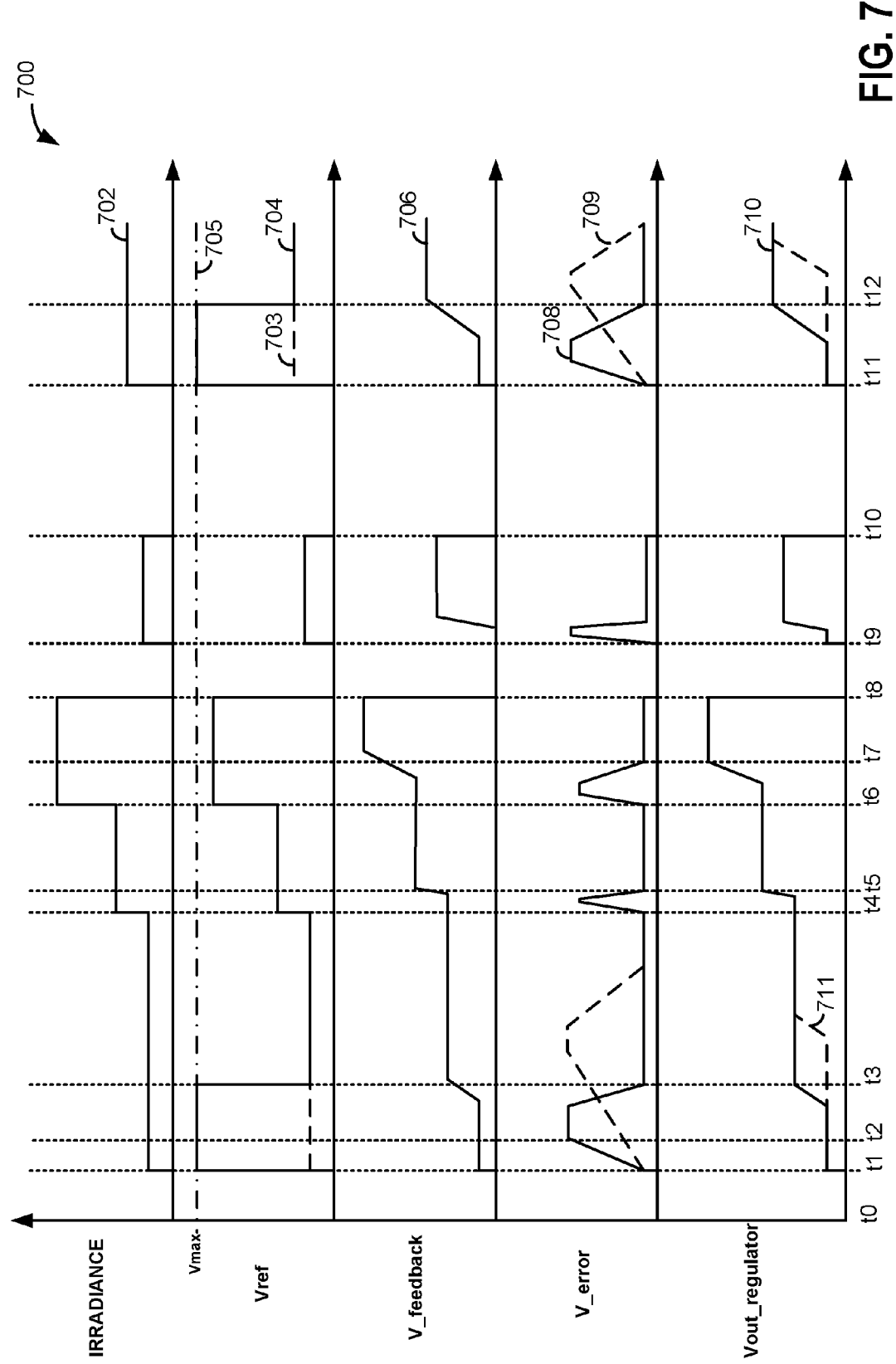
FIG. 7 shows an example adjustment of a reference voltage of the error amplifier shown in FIG. 4 for providing accelerated startup of a switching regulator driving the lighting system shown in FIGS. 1 and 3.

Referring now to FIG. 6, a method 600 for controlling output of a lighting system is shown. The lighting system may be lighting system 100 shown in FIG. 1 and/or array 20 shown in FIG. 3. Specifically, method 600 may be implemented to accelerate startup of a switching regulator, such as switching regulator 330 at FIG. 3. Method 600 will be described with respect to FIGS. 1 and 3 herein; however, it will be appreciated that method 600 may be applied to other lighting systems including a switching regulator and feedback circuit. Method 600 may be applied to a system as shown in FIGS. 1-3. The method may be stored as executable instructions in non-transitory memory of a controller, such as controller 108 at FIGS. 1 and 3. Further, the method of FIG. 6 may operate a lighting array as shown in FIG. 7.

At 602, method 600 judges if LEDs, such as LEDs 110 at FIGS. 1 and 3 are presently being commanded on or if LEDs are already activated. In one example, method 600 may judge if LEDs are being commanded on or already active in response to a controller input. The controller input may interface with a pushbutton or operator control. The controller input may be at a value of one if the LEDs are being commanded on or if the LEDs are already activated. If method 600 judges that LEDs are being commanded on, or if the LEDs are already on, the answer is yes and method 600 proceeds to 604. Otherwise, the answer is no and method 600 proceeds to exit.

At 604, method 600 includes determining operating conditions of the lighting array. Determining operating conditions may include, at 606, determining a desired intensity or irradiance of the lighting array. The desired intensity may vary from lighting system to lighting system and from work piece to work piece. In one example, the desired intensity may be determined from a control parameter file or an operator may manually select the desired intensity or irradiance level. The desired intensity or irradiance may be alternatively referred to as requested intensity herein. The control parameter file may include empirically determined values of irradiance for the lighting array. Determining operating conditions may further include, at 608, determining a desired current and/or power to operate the lighting array at the desired intensity or irradiance determined at 606. In one example, lighting array power may be determined via indexing a function or table of that includes empirically determined current or power levels that may be indexed via the desired irradiance. The table or function outputs the desired lighting array current and/or power. Determining operating conditions may further include, at 610, determining a desired reference voltage for the error amplifier Vref_desired and a desired output voltage of the voltage regulator Vout_desired, Vref_desired and Vout_desired based on the desired lighting array current and/or power determined at 608. Method 600 proceeds to 610 after Vref_desired and Vout_desired are determined.

At 610, method 600 judges if the LEDs are commanded ON from an OFF state. In one example, method 600 judges if the LEDs are commanded to ON state based on the irradiance or illuminance requested and a previous value of requested irradiance or illuminance (e.g., from 0% to desired irradiance). If the requested irradiance or illuminance changes from zero to the desired irradiance, the answer is yes and method 600 proceeds to 612. Otherwise, the answer is no and method 600 proceeds to 613.

At 612, method 600 includes determining a maximum voltage for Vref (Vref_maximum). In one example, Vref_maximum may be based on a maximum irradiance of the lighting array. Thus, Vref_maximum may be based on 100% irradiance of the lighting array. The maximum irradiance or 100% irradiance of the lighting array may vary from lighting system to lighting system and from work piece to work piece. For example, the Vref_maximum may vary directly proportionally to maximum irradiance. Accordingly, a system with higher maximum irradiance capability may have a higher Vref_maximum compared to a system with a lower maximum irradiance capability. Method 600 proceeds to 614 upon determining Vref_maximum. While the present example illustrates determining Vref_maximum based on 100% irradiance output of the lighting array, it will be appreciated that examples where Vref_maximum during startup is determined based on an irradiance output greater than requested irradiance output (when irradiance is less than 100%) is also within the scope of the present disclosure.

At 614, method 600 includes setting a voltage at a non-inverting input of an error amplifier, such as error amplifier 326, to the value of Vref_maximum. The voltage at the non-inverting input is the reference voltage Vref of the error amplifier. The reference voltage may be adjusted by a controller of the lighting array, such as controller 108 shown at FIGS. 1 and 3. When the lighting array is initially switched ON from an OFF state, the value of the reference voltage of the error amplifier at the non-inverting input may be set to Vref_maximum irrespective of the desired irradiance. For example, the lighting array may be started with a requested intensity of 10%. During the startup of the lighting array (that is, when lighting array is switched from an ON state to an OFF state), Vref may be adjusted to a first voltage based on 100 percent irradiance or intensity of the lighting array or maximum irradiance of the lighting array. Due to high input impedance at the inverting and non-inverting inputs of the error amplifier, current flows through the compensation network of the error amplifier. In one example, the compensation network may be implemented as shown in FIG. 4. While FIG. 4 illustrates a type III compensation network, other types of compensation network, such as type II and type I, are also within the scope of the present disclosure. By setting the reference voltage (Vref) of the error amplifier to Vref_maximum, a higher current flow is achieved through the compensation network during startup, which charges the capacitors in the compensator network at a faster rate. Therefore, a duration to reach an output voltage of the error amplifier that initiates an ON cycle in the output of the PWM generator decreases. As a result, the voltage regulator is switched ON at an earlier time.

Upon setting Vref to Vref_maximum, method 600 proceeds to 616. At 616, method 60 includes monitoring voltage output of the voltage regulator (Vout_regulator). Vout_regulator may be determined based on current flow through a resistor divider network, such as network 310, for example.

Next, at 618, method 600 judges if Vout_regulator has reached Vout_desired. If Vout_regulator is at or above Vout_desired, the answer at 618 is YES and method 600 proceeds to 620. Otherwise, the answer at 618 is NO, and method 600 proceeds to 622.

At 620, responsive to Vout_regulator reaching Vout_desired, method 600 includes setting the voltage at the non-inverting input (Vref) to Vref_desired, where Vref_desired is determined based on desired irradiance as discussed at step 608. For example, if the desired irradiance is 10%, responsive to Vout_regulator reaching Vout_desired, Vref may be adjusted from Vref_maximum (based on 100% irradiance) to Vref_desired (based on 10% irradiance). Upon setting Vref to Vref_desired, method 600 proceeds to 624. At 624, method 600 adjusts lighting array current and/or power via switching regulator 330, PWM generator 328, and error amplifier 326 as shown in FIG. 3.

At 622, responsive to Vout_regulator below Vout_desired, method 600 includes maintaining Vref at Vref_maximum until Vout regulator reaches Vout_desired. Responsive to Vout_regulator reaching Vout_desired, method 600 proceeds to 620 to set Vref to Vref_desired as discussed above.

In this way, during startup of the lighting array, Vref may be adjusted to a first voltage (Vref_maximum) based on 100% irradiance or intensity of the lighting array. Vref may be maintained until Vout_regulator reaches a desired voltage. Upon Vout_regulator reaching the desired voltage, Vref may be adjusted from the first voltage to a second voltage, the second voltage based on the requested irradiance or intensity. By setting Vref to Vref_maximum until the desired Vout_regulator is attained duration for charging the capacitors in the error amplifier circuit is reduced. As a result, start-up time of the switching regulator may be reduced.

Thus, method 600 provides an example method for operating a lighting array, the method comprising: setting a reference voltage at a non-inverting terminal of an operational amplifier receiving a feedback signal from the lighting array to a first voltage in response to activation of the lighting array from a deactivated state; and maintaining the reference voltage at the non-inverting terminal at the first voltage until an output voltage of a switching regulator driving the lighting array increases to a threshold voltage, the threshold voltage based on a requested output of the lighting array; where the first voltage is based on a maximum irradiance output of the lighting array. The method further comprises adjusting the reference voltage from the first voltage to a second voltage in response to the output voltage of the switching regulator reaching the threshold voltage, the second voltage based on the requested output of the lighting array.

Returning to 611, if the lighting array is not commanded ON from OFF state, the lighting array may be already operating. Accordingly, method 600 proceeds to 613. At 613, method 600 includes determining if startup of the switching regulator is completed. In one example, startup of the switching regulator may be determined complete if Vref has changed from Vref_maximum to Vref_desired from the time the lighting array was switched ON. In some examples, startup of the switching regulator may be determined complete based on a duration since the lighting array was switched ON. For example, if a threshold duration has elapsed since the lighting array was switched ON, startup may be determined complete. In still other examples, startup may be determined complete, if Vout_regulator is within an upper and lower threshold voltage of Vout_desired. If the answer at 613 is YES, startup is complete and method 600 proceeds to 620. Otherwise, method 600, startup is in progress (Vref at Vref_maximum) and method 600 proceeds to 622 to maintain Vref at Vref_maximum until Vout_regulator reached Vout_desired.

Further, subsequent to startup, during operation of the lighting array (that is, when lighting array is in an ON state) after adjusting Vref from Vref_maximum to Vref_desired, when a change in intensity or irradiance is requested, Vref may be adjusted based on the requested change in intensity. For example, during startup, the requested intensity of the lighting array may be 20%. Accordingly, Vref may be set to a voltage based on 100% intensity of the lighting array until Vout_desired is attained (Vout_desired being a voltage to achieve 20% irradiance or intensity of the lighting array). Responsive to Vout regulator reaching Vout_desired, Vref may be set to Vref_desired (Vref_desired based on the requested irradiance (20% irradiance in this example)). Subsequently, during operation of the array, the requested intensity may increase to 50%. Responsive to the change in requested intensity, Vref may be adjusted to Vref_desired, where Vref_desired is now based on 50% irradiance.

While the example method described at FIG. 6 illustrates monitoring Vout_regulator during start-up and adjusting Vref to Vref_desired based on the Vout_regulator, embodiments where additionally or alternatively, V_feedback and/or V_error are monitored and time point when Vref is adjusted to Vref_desired from Vref_maximum is based on Vfeedback and/or Verror, are also within the scope of the disclosure. Thus, in one example, a lighting system for operating one or more light emitting devices may comprise: one or more light emitting devices; a switching regulator including a regulator output in electrical communication with the one or more light emitting devices; an error amplifier including a first input, an second input, and an error output, the error output in electrical communication with the switching regulator via a pulse-width modulation generator; and a controller including non-transitory instructions to adjust the first input of the error amplifier to a first higher voltage in response to a startup of the lighting system, and adjust the first input of the error amplifier from the first higher voltage to a second voltage in response to the error output reaching a threshold voltage, the second voltage based on a requested output of the one or more light-emitting devices and the threshold voltage based on a minimum voltage to initiate an ON state of a duty cycle of the output of the pulse-width modulation generator.

Turning now to FIG. 7, an example operating sequence 700 of a lighting array, such as lighting array 20 at FIGS. 1 and 3, illustrating example adjustment of voltage (Vref) at an input of an error amplifier, such as error amplifier 326 at FIG. 3, is illustrated according to the present disclosure. The sequence 700 shown in FIG. 7 may be achieved by operating the array based on instructions stored in a memory of a controller of the array, such as controller 108. For example, the controller may implement the method of FIG. 6 to achieve the operating sequence of FIG. 7. In this example, FIG. 7 will be described with respect to FIG. 3.The first plot from the top of FIG. 1 shows desired irradiance versus time. Y axis represents irradiance and the irradiance increases in the direction of Y axis arrow. The desired irradiance may be a requested irradiance or intensity or illuminance, and may be based on a control parameter file or on a user-selected input.

The second plot from the top of FIG. 1 shows reference voltage (Vref) input at the non-inverting input of the error amplifier. Y axis represents the reference voltage and the reference voltage increases in the direction of Y axis arrow. Vref may be set by the controller, and may be based on an operating condition of the array. For example, during start-up conditions of the array, when the array is switched ON from an OFF state, Vref may be set at a first voltage based on the maximum irradiance (e.g., 100% irradiance) independent of requested irradiance. Subsequently, Vref may be adjusted to a voltage based on desired irradiance when the output voltage of a switching regulator, such as regulator 330 at FIG. 3, driving the array reaches a desired output voltage. The second plot includes trace 703, which shows changes in Vref, when Vref is based on the desired irradiance alone (that is, when Vref is not set at maximum at start-up). Horizontal line 705 represents Vref for a 100% requested irradiance of the array.

The third plot from the top of FIG. 7 shows feedback voltage (V_feedback) input at the inverting terminal of the error amplifier versus time. Y axis represents the feedback voltage and the feedback voltage increases in the direction of Y axis arrow. V-feedback is determined based on current flow through a sense resistor, such as resistor 255 at FIG. 3.

The fourth plot from the top of FIG. 7 shows voltage output of the error amplifier (V_error) versus time. Y axis represents V_error and V_error increases in the direction of Yaxis arrow. The fourth plot includes trace 709 depicting changes in V_error when Vref is adjusted based on the desired irradiance alone (that is, when Vref is not set at maximum at start-up).

The fifth plot from the top of FIG. 7 shows voltage output (Vout_regulator) of the switching regulator versus time. Y axis represents Vout_regulator and Vout_regulator increases in the direction of Y axis arrow. The fifth plot includes trace 711 depicting changes in output of the voltage regulator when Vref is adjusted based on the desired irradiance alone (that is, when Vref is not set at maximum at start-up).

In all the plots, the X axis represents time and time increases from the left to right of the plot.

At t0 and between t0 and t1, the lighting array is switched OFF. At t1, the lighting array is started up at a first desired irradiance. Responsive to the change in state of the lighting array from OFF state to ON state, at t1, Vref is set to a first voltage (Vmax), the first voltage based on the maximum irradiance (e.g., 100% irradiance or intensity) of the lighting array system (plot 704). Between t1 and t2, V_error increases. As shown by plots 708 and 709, V_error increases at a faster rate when Vref is set at maximum (plot 708) in response to start-up of the lighting array than when Vref is set based on the the desired irradiance (plot 709) at startup. V_error is fed into a PWM generator, which determines a duty cycle of the voltage regulator. Thus, V_error sets a threshold that determines a time when an ON portion of the duty cycle is started. Accordingly, responsive to the increase in V_error, the duty cycle of voltage output by the PWM generator initiates startup of the voltage regulator. Accordingly, between t2 and t3, responsive to the duty cycle of the PWM output fed into the voltage regulator, the Vout_regulator increases (plot 710). At t3, Vout_regulator reaches the desired voltage, where the desired voltage is determined based on the desired irradiance. Thus, when Vref is set to maximum at startup, Vout_regulator increases at a faster rate (plot 710) compared to the rate of increase in Vout_regulator when Vref is set based on the desired irradiance at start-up (plot 711). Responsive to Vout_regulator reaching the desired voltage, at t3, the Vref is reduced to a second voltage based on the desired irradiance (plot 704). Between t3 and t4, the lighting array continues to operate at the desired irradiance set at t1.

At t4, the desired irradiance increases to a second irradiance, for example, in response to an increase in irradiance request. Responsive to the increase in the desired irradiance, the controller increases the Vreference based on the desired irradiance. Between t4 and t6, the lighting array continues to operate at the desired irradiance set at t4. At t6, the desired radiance is further increased to a third irradiance in response to another increase in irradiance request. Responsive to the increase in the desired irradiance, the controller adjusts Vref based on the change in desired irradiance. Between t6 and t8, the lighting array continues to operate at the desired irradiance set at t6.

At t8, the lighting array is switched to an OFF state. The lighting array continues to remain in the OFF state between t8 and t9. The duration of OFF state between t8 and t9 may be less than a threshold duration. The controller may utilize a counter to monitor the duration of OFF state. The threshold duration may be based on a number of capacitors and the values of the capacitors in the compensation network, for example. The threshold duration may be utilized to determine value of Vref at start-up. As an example, if the duration of OFF state is less than a threshold duration, the capacitors may retain charge for the duration of the OFF state and therefore, Vref at start-up may be set based on the desired irradiance of the lighting array. However, if the duration of OFF state is greater than the threshold duration, the charge on the capacitors in the compensation network may be depleted. Therefore, Vref at start-up may be set to maximum irradiance irrespective of the desired irradiance in order to accelerate the rate of charging of the capacitors and hence, reduce the start-up time of the switching regulator.

At t9, the lighting array is switched to the ON state and the desired irradiance is adjusted to a fourth irradiance. Responsive to the change in state of the lighting array from the OFF state to the ON state and the duration of OFF state less than a threshold duration, Vreference is adjusted based on the desired irradiance. Between t9 and t10, the lighting array continues to operate with the desired irradiance at the fourth irradiance.

At t10, the lighting array is switched to the OFF state. Between t10 and t11, the lighting array continues to remain in the OFF state. The duration of OFF state between t10 and tll may be greater than the threshold duration.

At t11, the lighting array is switched to the ON state and the desired irradiance is adjusted to a fifth irradiance. Responsive to the change in state of the lighting array from the OFF state to the ON state, and the duration of the OFF state greater than the threshold duration, at t11, the controller adjusts Vreference to maximum voltage. Consequently, more current is pushed through the compensation network, which accelerates the rate of charging of the capacitors in the compensation network. As a result, V_error increases at a faster rate, which reduces the delay in initiating the ON cycle of the duty cycle output by the PWM generator. Consequently, delay in the output of the voltage regulator reaching the desired voltage is reduced and hence, delay in the lighting array output is reduced. In this way, by setting Vref to the maximum voltage, delay in start-up of the voltage regulator is reduced.

At t12, the Vout_regualtor reaches the desired voltage. Responsive to the Vout_regulator reaching the desired voltage, at t12, controller adjusts Vref based on the fifth irradiance set at t11. In this example, the fifth irradiance is less than the maximum irradiance. Accordingly, at t12, the controller reduces Vref, the amount of decrease based on the difference between the maximum irradiance and the fifth irradiance.

As one embodiment a lighting system for operating one or more light emitting devices includes one or more light emitting devices; a switching regulator including a regulator output in electrical communication with the one or more light emitting devices; an error amplifier including a first input, an second input, and an error output, the error output in electrical communication with the switching regulator via a pulse-width modulation generator; and a controller including non-transitory instructions to adjust the first input of the error amplifier to a first higher voltage in response to a startup of the lighting system. A first example of the lighting system includes where the first higher voltage is based on a maximum irradiance capability of the one or more light emitting devices. A second example of the lighting system optionally includes the first example and further includes where the controller includes additional instructions to adjust the first input of the error amplifier from the first higher voltage to a second voltage in response to the regulator output of the switching regulator reaching a desired voltage, the second voltage and the desired voltage based on a requested output of the one or more light-emitting devices. A third example of the lighting system optionally includes one or more of the first and second examples, and further includes where the second voltage is less than the first higher voltage. A fourth example of the lighting system optionally includes one or more of the first through third examples, and further includes, where the first input is a non-inverting input and the second input is an inverting input. A fifth example of the lighting system optionally includes one or more of the first through fourth examples, and further includes, where the error amplifier includes a compensation network comprising at least one capacitor coupling the output of the error amplifier with the second input. A sixth example of the lighting system optionally includes one or more of the first through fifth examples, and further includes, where the second input is in electrical communication with the one or more light emitting devices and receives a feedback voltage from the one or more light emitting devices. A seventh example of the lighting system optionally includes one or more of the first through sixth examples, and further includes, where the controller includes additional instructions to: during an ON state of the lighting system, in response to a change in the requested output after the first input is adjusted from the first higher voltage to the second voltage, adjust the voltage at the first input based on the change.

As another embodiment, a method for operating a lighting array includes setting a reference voltage at a non-inverting terminal of an operational amplifier receiving a feedback signal from the lighting array to a first voltage in response to activation of the lighting array from a deactivated state; and maintaining the reference voltage at the non-inverting terminal at the first voltage until an output voltage of a switching regulator driving the lighting array increases to a threshold voltage, the threshold voltage based on a requested output of the lighting array; where the first voltage is based on a maximum irradiance output of the lighting array. A first example of the method includes adjusting the reference voltage from the first voltage to a second voltage in response to the output voltage of the switching regulator reaching the threshold voltage, the second voltage based on the requested output of the lighting array. A second example of the method optionally includes the first example and further includes after adjusting the reference voltage from the first voltage to the second voltage, responsive to a change in the requested output of the lighting array, adjusting the reference voltage based on the change requested. A third example of the method optionally includes one or more of the first and second examples, and further includes where the switching regulator driving the lighting array is a buck regulator. A fourth example of the method optionally includes one or more of the first through third examples, and further includes, where the operational amplifier is coupled to a compensation network between an inverting terminal and an output of the operational amplifier, the compensation network including at least one capacitor and one resistor coupled in series.

As another embodiment, a method for operating one or more light emitting devices comprises during a first condition, when the one or more light emitting devices are commanded to an ON state from an OFF state, adjusting a reference voltage of an error amplifier receiving a feedback voltage from the one or more light emitting devices to a first voltage, the first voltage based on a maximum irradiance output of the one or more light emitting devices; and during a second condition, when the one or more light emitting devices are operating in the ON state, adjusting the reference voltage based on a requested output of the one or more light emitting devices. A first example of the method includes during the first condition, responsive to an output of a buck stage regulator driving the one or more light emitting devices reaching a desired output, adjusting the reference voltage from the first voltage to a second voltage, the desired output and the second voltage based on the requested output of the one or more light emitting devices. A second example of the method optionally includes the first example and further includes during the first condition, responsive to an output of the error amplifier reaching a threshold error output, adjusting the reference voltage from the first voltage to a second voltage. A third example of the method optionally includes one or more of the first and second examples, and further includes where the threshold error output is based on an error voltage to command a threshold duty cycle of a pulse-width modulation generator operating a buck stage regulator driving the one or more light emitting devices, the threshold duty cycle based on a duration to energize the buck stage regulator; [inventor please confirm] and where the second voltage is based on the requested output of the one or more light emitting devices. A fourth example of the method optionally includes one or more of the first through third examples, and further includes, where the second condition further includes a change in the requested output of the one or more light emitting devices. A fifth example of the method optionally includes one or more of the first through fourth examples, and further includes, where the output of the buck regulator is a voltage. A sixth example of the method optionally includes one or more of the first through fifth examples, and further includes, where the error amplifier includes one or more capacitors and one or more resistors in a feedback loop coupling the output of the error amplifier with an inverting input of the error amplifier receiving the feedback voltage; and where the reference voltage is supplied at a non-inverting input of the error amplifier.

As will be appreciated by one of ordinary skill in the art, the methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the lighting control system.

This concludes the description. The reading of it by those skilled in the art would bring to mind many alterations and modifications without departing from the spirit and the scope of the description. For example, lighting sources producing different wavelengths of light may take advantage of the present description.

The invention claimed is:

1. A lighting system for operating one or more light emitting devices, comprising:
one or more light emitting devices;
a switching regulator including a regulator output in electrical communication with the one or more light emitting devices;
an error amplifier including a first input, a second input, and an error output, the error output in electrical communication with the switching regulator via a pulse-width modulation generator; and
a controller including executable instructions stored in non-transitory memory to apply a first voltage and a second voltage to the first input of the error amplifier, the second voltage corresponding to a desired irradiance of the one or more light emitting devices, the first voltage independent from the desired irradiance, the first voltage applied to the first input in response to a startup of the lighting system, and the first voltage based on a maximum irradiance capability of the one or more light emitting devices.

2. The lighting system of claim 1, where the controller includes additional instructions to monitor the regulator output of the switching regulator and adjust the first input of the error amplifier from the first voltage to the second voltage in response to the regulator output of the switching regulator reaching a desired voltage, the second voltage and the desired voltage based on a requested output of the one or more light emitting devices and the second voltage being less than the first voltage during the startup of the lighting system.

3. The lighting system of claim 2, where the first voltage is based on a first percentage of an irradiance capability of the one or more light emitting devices, where the second voltage is based on a second percentage of the irradiance capability of the one or more light emitting devices, and where the first percentage is 100% and the second percentage is less than 100%.

4. The lighting system of claim 1, where the first input is a non-inverting input and the second input is an inverting input, and where the second voltage is applied to the first input after the startup of the lighting system.

5. The lighting system of claim 1, where the error amplifier includes a compensation network comprising at least one capacitor coupling the error output of the error amplifier with the second input.

6. The lighting system of claim 1, where the second input is in electrical communication with the one or more light emitting devices and receives a feedback voltage from the one or more light emitting devices.

7. The lighting system of claim 2, where the controller includes additional instructions to, during an ON state of the lighting system, in response to a change in the requested output after the first input is adjusted from the first voltage to the second voltage, adjust the voltage at the first input based on the change.

8. A method for operating a lighting array, comprising:
setting a reference voltage at a non-inverting terminal of an operational amplifier and receiving a feedback signal from the lighting array to a first voltage that is greater than a second voltage that corresponds to a presently desired irradiance output of the lighting array in response to activation of the lighting array from a deactivated state; and
maintaining the reference voltage at the non-inverting terminal at the first voltage until an output voltage of a switching regulator driving the lighting array increases to a threshold voltage, the threshold voltage based on a requested output of the lighting array; where the first voltage is based on a maximum irradiance output of the lighting array.

9. The method of claim 8, further comprising monitoring the output voltage of the switching regulator based on current flow through a resistor divider network coupled to an output of the switching regulator, and adjusting the reference voltage from the first voltage to the second voltage in response to the output voltage of the switching regulator reaching the threshold voltage, the second voltage lower than the first voltage and based on the requested output of the lighting array.

10. The method of claim 9, further comprising, after adjusting the reference voltage from the first voltage to the second voltage, responsive to a change in the requested output of the lighting array, adjusting the reference voltage based on the change requested.

11. The method of claim 8, where the switching regulator driving the lighting array is a buck regulator.

12. The method of claim 8, where the operational amplifier is coupled to a compensation network between an inverting terminal and an output of the operational amplifier, the compensation network including at least one capacitor and one resistor coupled in series.

13. A method for operating one or more light emitting devices, comprising:
during a first condition, when the one or more light emitting devices are commanded to an ON state from an OFF state, adjusting a reference voltage applied to an error amplifier receiving a feedback voltage from the one or more light emitting devices to a first voltage when a desired irradiance output of the one or more light emitting devices is represented via a second voltage, the first voltage based on a maximum irradiance output of the one or more light emitting devices and independent of a requested output of the one or more light emitting devices, the first voltage greater than the second voltage; and
during a second condition, when the one or more light emitting devices are operating in the ON state, adjusting the reference voltage based on the requested output of the one or more light emitting devices.

14. The method of claim 13, further comprising, during the first condition, responsive to an output of a buck stage regulator driving the one or more light emitting devices reaching a desired output, adjusting the reference voltage from the first voltage to the second voltage, the desired output and the second voltage based on the requested output of the one or more light emitting devices.

15. The method of claim 13, further comprising, during the first condition, responsive to an output of the error amplifier reaching a threshold error output, adjusting the reference voltage from the first voltage to the second voltage.

16. The method of claim 15, where the threshold error output is based on an error voltage to command a threshold duty cycle of a pulse-width modulation generator operating a buck stage regulator driving the one or more light emitting devices, the threshold duty cycle based on a duration to energize the buck stage regulator; and where the second voltage is based on the requested output of the one or more light emitting devices.

17. The method of claim 13, where the second condition further includes a change in the requested output of the one or more light emitting devices.

18. The method of claim 14, where the output of the buck stage regulator is a voltage.

19. The method of claim 13, where the error amplifier includes one or more capacitors and one or more resistors in a feedback loop coupling output of the error amplifier with an inverting input of the error amplifier receiving the feedback voltage; and where the reference voltage is supplied at a non-inverting input of the error amplifier.

\* \* \* \* \*